(No Model.)
T. W. CARMICHAEL.
CLAY STEAMER.
No. 598,282. Patented Feb. 1, 1898.
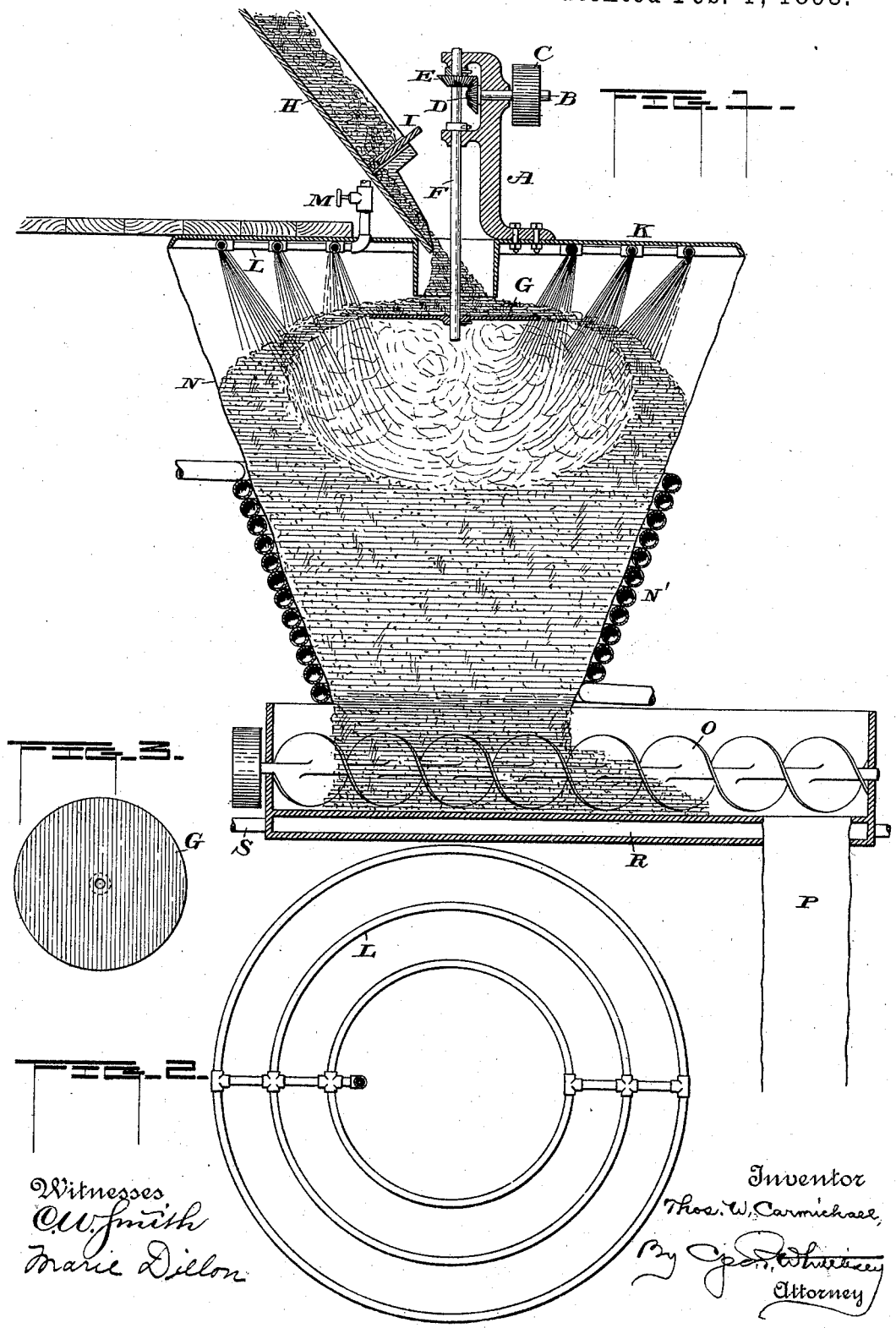

United States Patent Office.

THOMAS W. CARMICHAEL, OF WELLSBURG, WEST VIRGINIA.

CLAY-STEAMER.

SPECIFICATION forming part of Letters Patent No. 598,282, dated February 1, 1898.

Application filed March 25, 1896. Serial No. 584,773. (No model.)

*To all whom it may concern:*

Be it known that I, THOMAS W. CARMICHAEL, a citizen of the United States, residing at Wellsburg, in the county of Brooke and State of West Virginia, have invented certain new and useful Improvements in Clay-Steamers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to apparatus for steaming and moistening clay preparatory to molding it into bricks by hand or machinery.

Clay when moistened and heated bonds better on being pressed into bricks, since the steam develops plasticity in the clay and the heated clay heats the press, and consequently the clay works without sticking to the metal of the press. The result is that the body of the brick is more dense, the surface is smoother, and the edges are sharper and harder. Furthermore, bricks made of heated clay are less likely to check in drying, because the temperature of the bricks is brought nearer to that of the drying-tunnel. This is especially the case in cold wintry weather. The bricks being pressed at a temperature at or below freezing-point and then transferred to a drier in which the temperature is from 70° to 100° Fahrenheit the change is so great that the bricks are checked and cracked and thus become unsalable; but by using heated clay the temperature of the bricks is very nearly that of the drier, so that there is no sudden change and therefore no loss from checking.

My invention consists in a horizontal rotating disk to receive and scatter the finely-divided clay, with a concentric steam pipe or pipes having perforations to permit the escape of the steam and hot water of condensation in jets which blow through the shower of clay thrown off by the disk and thus thoroughly moisten and heat the clay. I also use a flexible hopper, with a rigid jacket surrounding a portion of it.

In the drawings, Figure 1 is a vertical sectional elevation of my improved clay-steamer. Fig. 2 is a plan view of the steam-pipes. Fig. 3 is a plan view of the disk.

In a suitable frame A is journaled a horizontal shaft B, provided with a belt-pulley C and a beveled gear D, the latter meshing with a beveled gear E, fastened upon a vertical shaft F, journaled in the frame A and carrying at its lower end a disk G. Above the disk G is a spout H, leading from a hopper or other source of supply, the flow of the finely-divided clay through the spout being regulated by a sliding gate I. The clay after leaving the spout passes through an opening in the top K of the steamer, preferably a downwardly-projecting neck, as shown, to guide the clay to the center of the disk.

Up under the top of the steamer is a system of steam-pipes L, having perforations on the upper side so arranged as to give a series of converging jets of steam and hot water, which pass by the edge of the disk into the space below. The supply of steam is controlled by a stop-valve M.

The hopper N of the steamer is composed of flexible material, such as sail-cloth, so that by a pressure of the hand against it any tendency in the clay to clog may be easily corrected.

Surrounding the lower portion of the hopper is a rigid jacket, which may consist of a coil of steam-pipe N'. The jacket supports the hopper against inside pressure, and if hollow, as shown, it may be used to keep the clay hot. The hopper is not attached to the jacket, but rests loosely within it, so that if necessary the lower end of the hopper can be lifted out of the jacket in order to give access to the hopper for the purpose of removing clay or foreign substances or to start the clay running in case of accidental stoppage. These operations can be performed while the machine is running.

From the bottom of the steamer the clay is carried by gravity or by mechanical appliances to the press or other place where it is to be used or stored. In the drawings I have shown it discharging into a pugging-mill to further mix and improve the clay, which is thoroughly stirred by the worm O and carried forward to the sack or sacks P, which carry the clay to the brick-machine. The pugging-mill has preferably a hollow bottom R, through which steam is circulated from the pipe S to keep the clay hot and prevent its adhering to the bottom.

The operation of my machine is as follows: The finely-divided clay is fed to the center of the rapidly-revolving disk G, from which it is thrown off by centrifugal force in a thin sheet in a direction transverse to the jets of steam and hot water issuing from the pipes L. The clay thus becomes thoroughly moistened and heated and in this condition falls down through the hopper to the sacks of the brick-machine or the intermediate pugging-mill or the like.

I am aware that in the art of steaming grain apparatus has been used which somewhat resembles mine in the general character of the elements employed; but such apparatus cannot be used for steaming clay, owing to the narrow and crooked passages for the material to pass through and the multiplicity of parts, all of which would quickly clog up with the damp clay and thus render the machine inoperative.

Having thus described my invention, what I claim, and desire to secure by Letters Patent, is—

1. A clay-steamer, consisting of a closed top having a downwardly-projecting spout, a flexible hopper suspended from the edge of said closed top, a system of steam-pipes secured under said top, and having perforations to give a series of steam-jets converging toward the lower part of the hopper, an upright shaft passing down into the hopper, means for rotating the shaft, a disk secured to the lower end of the shaft below the spout and inside the line of the steam-jets, and a rigid jacket surrounding a portion of the flexible hopper but not attached thereto, substantially as described.

2. A clay-steamer, consisting of a closed top having a central downwardly-projecting spout, a hopper of flexible material suspended from the edge of said closed top, a system of steam-pipes secured under said top and having perforations giving a series of steam-jets converging toward the lower part of the hopper, an upright shaft passing down through said spout into the hopper, means for rotating the shaft, a disk secured to the lower end of the shaft below the spout, and inside the line of the steam-jets, and a steam-coil surrounding the lower portion of the hopper and supporting the same against inside pressure, substantially as described.

3. A clay-steamer, consisting of a suitable hopper having a closed top provided with a downwardly-projecting spout, a system of steam-pipes secured under said top and having perforations to give a series of steam-jets converging toward the lower part of the hopper, an upright shaft passing down into the hopper, means for rotating the shaft, and a disk secured to the lower end of the shaft below the spout and inside the line of the steam-jets, substantially as described.

In testimony whereof I affix my signature in presence of two witnesses.

THOMAS W. CARMICHAEL.

Witnesses:
W. T. NICHOLLS,
H. C. HERVEY.